United States Patent
Huang et al.

(10) Patent No.: US 12,483,797 B2
(45) Date of Patent: Nov. 25, 2025

(54) IMAGE SENSING DEVICE AND CONTROL DEVICE OF ILLUMINATION DEVICE THEREOF

(71) Applicant: HTC Corporation, Taoyuan (TW)

(72) Inventors: Chao Shuan Huang, Taoyuan (TW); Sheng-Long Wu, Taoyuan (TW); Yu-Jui Hsu, Taoyuan (TW); Shih-Yao Tsai, Taoyuan (TW); Tun-Hao Chao, Taoyuan (TW); Sen-Lin Chung, Taoyuan (TW); Chih Pin Chung, Taoyuan (TW); Chih-Yuan Chien, Taoyuan (TW); Shih Hong Sun, Taoyuan (TW)

(73) Assignee: HTC Corporation, Taoyuan (TW)

( * ) Notice: Subject to any disclaimer, the term of this patent is extended or adjusted under 35 U.S.C. 154(b) by 245 days.

(21) Appl. No.: 18/325,002

(22) Filed: May 29, 2023

(65) Prior Publication Data

US 2024/0089607 A1 Mar. 14, 2024

Related U.S. Application Data

(60) Provisional application No. 63/404,542, filed on Sep. 8, 2022.

(51) Int. Cl.
*H04N 23/74* (2023.01)

(52) U.S. Cl.
CPC .................. *H04N 23/74* (2023.01)

(58) Field of Classification Search
CPC ........ H04N 23/74; H04N 23/60; H04N 23/71; Y02B 20/40; H05B 47/10
See application file for complete search history.

(56) References Cited

U.S. PATENT DOCUMENTS

| | | | | |
|---|---|---|---|---|
| 4,623,929 A | * | 11/1986 | Johnson | H05B 41/34 315/241 S |
| 2005/0270413 A1 | | 12/2005 | Hatano et al. | |
| 2014/0340572 A1 | * | 11/2014 | Sato | H04N 23/69 348/370 |

FOREIGN PATENT DOCUMENTS

CN 103685964 3/2014

OTHER PUBLICATIONS

"Office Action of Taiwan Counterpart Application", issued on Mar. 26, 2024, p. 1-p. 9.

* cited by examiner

*Primary Examiner* — Lin Ye
*Assistant Examiner* — Tuan H Le
(74) *Attorney, Agent, or Firm* — JCIPRNET

(57) ABSTRACT

An image sensing device and a control device of an illumination device thereof are provided. The control device includes a control circuit, an operation circuit, and multiple driving signal generators. The control circuit generates multiple control signals. The operation circuit performs a logical operation on the control signals and an image capturing signal to generate multiple operation results. The driving signal generator respectively provides multiple driving signals to the illumination device according to the operation results, and the driving signals respectively have multiple different output powers.

14 Claims, 2 Drawing Sheets

IMAGE SENSING DEVICE AND CONTROL DEVICE OF ILLUMINATION DEVICE THEREOF

CROSS-REFERENCE TO RELATED APPLICATION

This application claims the priority benefit of U.S. provisional application Ser. No. 63/404,542, filed on Sep. 8, 2022. The entirety of the above-mentioned patent application is hereby incorporated by reference herein and made a part of this specification.

BACKGROUND

Technical Field

The invention relates to an image sensing device and a control device of an illumination device thereof, and more particularly, to an image sensing device that may dynamically adjust an illumination brightness in real-time and a control device of an illumination device thereof.

Description of Related Art

In current technical field, exposure modes of an illumination device provided by an image sensing device are only a limited number of modes. In these modes, the image sensing device only adjusts a length of an exposure time provided by the illumination device. Moreover, in a switching operation of these modes, the image sensing device may only transmit a command of the switching operation through a slow serial transmission interface or fast switching of a limited number of groups/permutations. Therefore, the image sensing device in the conventional technology cannot adjust the exposure operation of the illumination device in real-time, resulting in a decrease in the performance of the image sensing device.

SUMMARY

The invention provides an image sensing device and a control device of an illumination device thereof, which may dynamically adjust an illumination brightness generated by the illumination device in real-time.

A control device of an illumination device in the invention is adapted to an image sensing device. The control device includes a control circuit, an operation circuit, and multiple driving signal generators. The control circuit generates multiple control signals. The operation circuit performs a logical operation on the control signals and an image capturing signal to generate multiple operation results. The driving signal generators respectively provide multiple driving signals to the illumination device according to the operation results, and the driving signals respectively have multiple different output powers.

An image sensing device in the invention includes a camera sensor, an illumination device, and a control device. The camera sensor provides an image capturing signal. The illumination device includes multiple illumination elements. The control device includes a control circuit, an operation circuit, and multiple driving signal generators. The camera sensor provides the image capturing signal. The illumination device includes the illumination elements. The control circuit generates multiple control signals. The operation circuit performs a logical operation on the control signals and the image capturing signal to generate multiple operation results. The driving signal generators respectively provide multiple driving signals to the illumination device according to the operation results, and the driving signals respectively have multiple different output powers.

Based on the above, the control device in the invention provides the control signals through the control circuit, and generates in collaboration with the image capturing signal the driving signals. The control device drives the illumination device through the driving signals with different output powers, thereby dynamically adjusting the illumination brightness generated by the illumination device in real-time, and improving working efficiency of the image sensing device.

DESCRIPTION OF THE EMBODIMENTS

Figure 1:
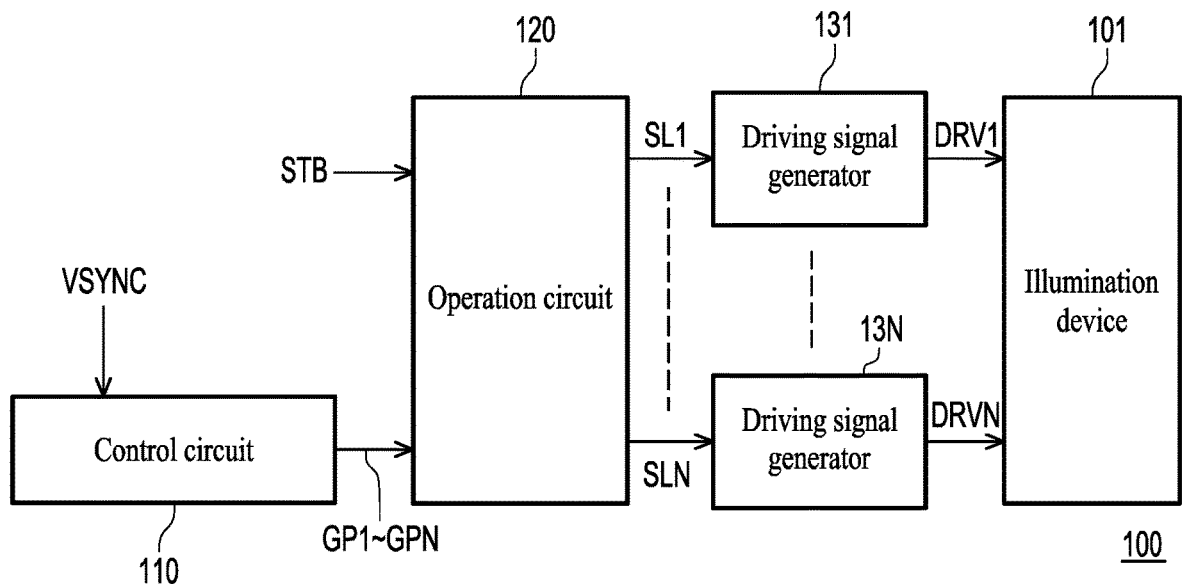
FIG. 1 is a schematic diagram of a control device of an illumination device according to an embodiment of the invention.

Referring to FIG. 1, FIG. 1 is a schematic diagram of a control device of an illumination device according to an embodiment of the invention. An illumination device 101 is adapted to an image sensing device, such as a camera. A control device 100 includes a control circuit 110, an operation circuit 120 and multiple driving signal generators 131-13N. The control device 100 is coupled to the illumination device 101 and used for controlling a lighting timing and the illumination intensity of the illumination device 101.

In the embodiment, the control circuit 110 is coupled to the operation circuit 120. The control circuit 110 may receive a vertical synchronization signal VSYNC, and generate multiple control signals GP1-GPN. The control circuit 110 transmits the control signals GP1-GPN to the operation circuit 120. The operation circuit 120 further receives an image capturing signal STB, and performs logic operations on the control signals GP1-GPN and the image capturing signal STB respectively to generate multiple operation results SL1-SLN respectively.

The image capturing signal STB may be used to indicate a time interval for a camera sensor in the image sensing device to perform an image capturing operation. When the camera sensor performs the image capture operation, the illumination device 101 needs to send out a corresponding illumination brightness to facilitate the image capturing operation of the image sensing device.

The operation circuit 120 is further coupled to the driving signal generators 131-13N. The operation circuit 120 transmits the operation results SL1-SLN to the driving signal generators 131-13N respectively. The driving signal generators 131-13N generate multiple driving signals DRV1-DRVN respectively according to the operation results SL1-SLN, where the driving signals DRV1-DRVN respectively have different output powers.

In the embodiment, the driving signal generators 131-13N may respectively generate the driving signals DRV1-DRVN with different output powers. Where, each of the driving signal generators 131-13N may be enabled or disabled according to the corresponding received operation results SL1-SLN, so as to determine whether to output the corresponding driving signals DRV1-DRVN. When all of the driving signal generators 131-13N do not generate the driving signals to the illumination device 101, the illumination device 101 does not emit light. When at least one of the driving signal generators 131-13N generates the corresponding driving signals DRV1-DRVN to the illumination device 101, the illumination device 101 may emit light, and the illumination brightness generated by the illumination device 101 is proportional to a sum of the output powers of the received at least one of the driving signals DRV1-DRVN.

Namely, in the embodiment, by adjusting the number of the enabled driving signal generators 131-13N, the illumination brightness generated by the illumination device 101 may be dynamically adjusted. Furthermore, the control circuit 110 may dynamically adjust the control signals GP1-GPN in real-time to achieve the effect of adjusting the illumination brightness generated by the illumination device 101, so as to effectively improve the performance of the image sensing device.

On the other hand, the control circuit 110 may set a time point for generating the control signals GP1-GPN according to the received vertical synchronization signal VSYNC. In the image sensing device, the vertical synchronization signal VSYNC may be used as a medium for setting an image capturing frame period. Further, the image sensing device may indicate the start of one image capturing frame period by enabling the vertical synchronization signal VSYNC. Therefore, the control circuit 110 may learn a start time point of each image capturing frame period according to the vertical synchronization signal VSYNC, and generate the control signals GP1-GPN to the operation circuit 120 at a setting time point after the start of each image capturing frame period.

In the embodiment, the image sensing device may periodically enable the vertical synchronization signal VSYNC. A time length of the image capturing frame period is equal to a time length for the vertical synchronization signal VSYNC being enabled twice consecutively. The image capturing frame period may be a fixed value, or may be properly adjusted according to an exposure requirement of an image to be captured. In the embodiment of the invention, the adjustment and setting of the image capturing frame period may be implemented in a manner well known to those skilled in the art without any specific limitation.

In the embodiment, the control circuit 110 may generate the control signals GP1-GPN through a general purpose input output (GPIO) interface. Therefore, the control circuit 110 may quickly adjust the control signals GP1-GPN in real-time, and may dynamically adjust the illumination brightness of the illumination device 101 in real-time. The control circuit 110 may be a digital circuit.

It should be noted that the driving signal generators 131-13N of the invention may generate the driving signals DRV1-DRVN as current signals or voltage signals without any specific limitation. The illumination device 101 may include one or multiple light-emitting elements, and the light-emitting elements may be made of, for example, light-emitting diodes, or other light-emitting materials well known to those skilled in the art without any specific limitation.

Figure 2:
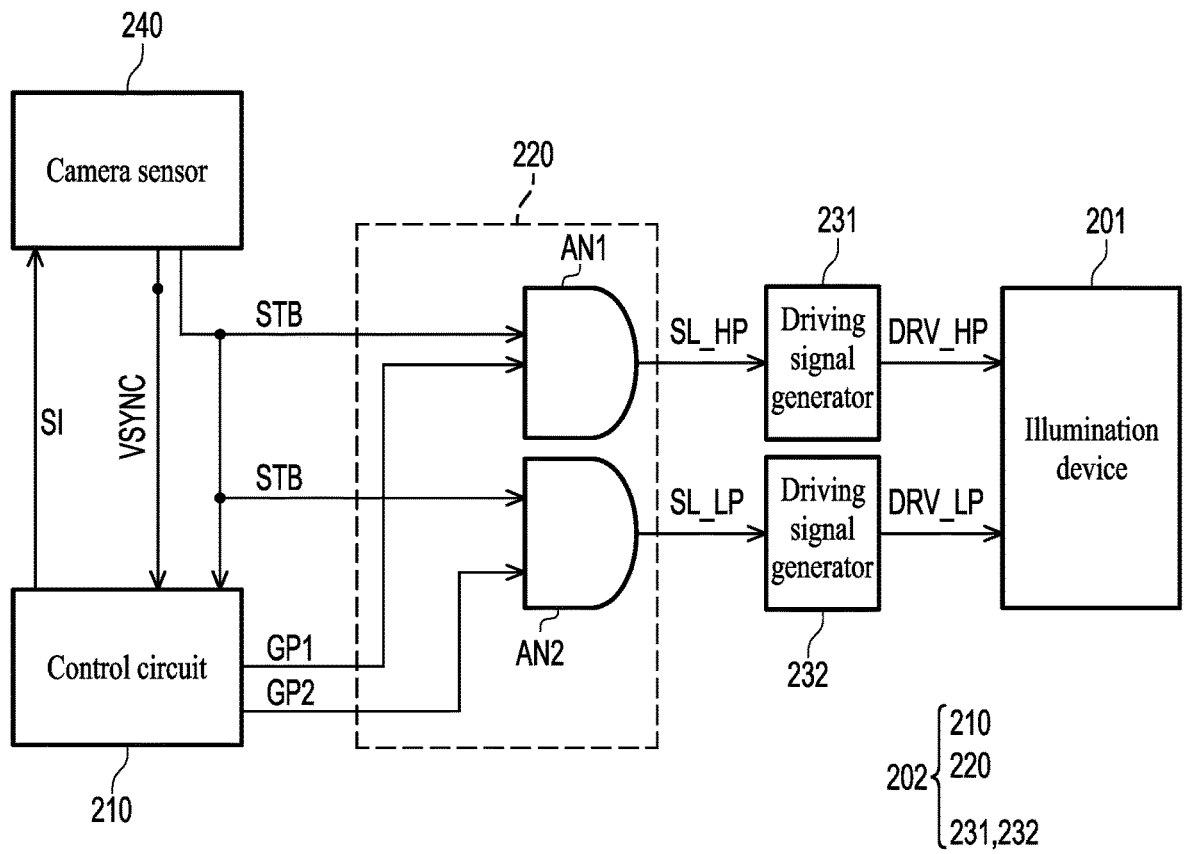
FIG. 2 is a schematic diagram of an image sensing device according to an embodiment of the invention.

Referring to FIG. 2 below, FIG. 2 is a schematic diagram of an image sensing device according to an embodiment of the invention. An image sensing device 200 includes a control device 202, a camera sensor 240 and an illumination device 201. The control device 202 includes a control circuit 210, an operation circuit 220 and multiple driving signal generators 231, 232. The control device 202 is coupled to the illumination device 201 and is used for controlling a lighting timing and illumination intensity of the illumination device 201.

In the embodiment, the camera sensor 240 is coupled to the control circuit 210 and the operation circuit 220. The camera sensor 240 may provide the image capturing signal STB to the control circuit 210 and the operation circuit 220, and may transmit the vertical synchronization signal VSYNC to the control circuit 210. There is also a serial transmission interface SI between the camera sensor 240 and the control circuit 210, which may be used for data transmission between the camera sensor 240 and the control circuit 210.

In the embodiment, the control circuit 210 may set a time point for generating the control signals GP1 and GP2 according to the vertical synchronous signal VSYNC, and may provide the control signals GP1, GP2 to the operation circuit 220 at a setting time point of each image capturing frame period according to the vertical synchronization signal VSYNC. The operation circuit 220 includes AND gates AN1 and AN2. Where, the AND gate AN1 receives the control signal GP1 and the image capturing signal STB, and performs a logical (AND) operation on the control signal GP1 and the image capturing signal STB to generate an operation result SL_HP. The AND gate AN2 receives the control signal GP2 and the image capturing signal STB, and performs a logical (AND) operation on the control signal GP2 and the image capturing signal STB to generate an operation result SL_LP.

In the embodiment, when the image capturing signal STB is at a logic high level, it indicates that the camera sensor is in a time interval for performing an image capturing operation.

The operation circuit 220 respectively sends the operation results SL_HP, SL_LP to the driving signal generators 231, 232. The driving signal generator 231 generates a driving signal DRV_HP according to the operation result SL_HP, and the driving signal generator 232 generates a driving signal DRV_LP according to the operation result SL_LP. Where, an output power of the driving signal DRV_HP may be higher than that of the driving signal DRV_LP.

In the embodiment, when the image capturing signal STB is at a logic high level, and the control signals GP1 and GP2 are both at a logic low level, the operation results SL_HP and SL_LP are both at the logic low level, and both of the driving signal generators 231 and 232 do not provide the driving signals DRV_HP and DRV_LP to the illumination device 201, so that the illumination device 201 does not emit light. When the image capturing signal STB is at the logic high level, and the control signals GP1 and GP2 are respectively at the logic low level and the logic high level, the operation results SL_HP and SL_LP are respectively at the logic low level and the logic high level, and only the signal generator 232 provides the driving signal DRV_LP to the illumination device 201, and the illumination brightness generated by the illumination device 201 may have a relatively low first brightness.

When the image capturing signal STB is at the logic high level, and the control signals GP1 and GP2 are respectively at the logic high level and the logic low level, the operation results SL_HP and SL_LP are respectively at the logic high level and the logic low level, and only the driving signal generator 231 provides the driving signal DRV_HP to the illumination device 201, and the illumination device 201 may have the illumination brightness of the second brightness, where the second brightness is higher than the first brightness.

When the image capturing signal STB is at the logic high level, and the control signals GP1 and GP2 are both at the logic high level, the operation results SL_HP and SL_LP are both at the logic high level, and the driving signal generators 231 and 232 respectively provide the driving signals DRV_HP, DRV_LP to the illumination device 201, and the illumination device 201 may have the illumination brightness of a third brightness, where the third brightness is higher than the second brightness.

In addition, in the embodiment, a lighting time length of the illumination device 201 may also be adjusted. The camera sensor 240 may adjust the lighting time length of the illumination device 201 by adjusting a time length during which the image capturing signal STB is at the logic high level. To be specific, when the camera sensor 240 sets the image capturing signal STB to the logic high level, the control device 202 may adjust the illumination brightness of the illumination device 201 according to the above-mentioned embodiment. In contrast, when the camera sensor 240 sets the image capturing signal STB to the logic low level, lighting of the illumination device 201 is stopped.

In the embodiment, a time length for the image capturing signal STB to be enabled may be set through the serial transmission interface SI.

In an implementation of the embodiment, a relationship between the settings of the control signals GP1 and GP2 and the corresponding illumination brightness is shown in the following table:

| GP1 | GP2 | Percentage of the image capturing signal STB in the image capturing frame period | Illumination brightness |
|---|---|---|---|
| 0 | 0 | 50% | No lighting |
| 1 | 0 | 50% | Low output power |
| 0 | 1 | 30% | High output power |
| 1 | 1 | 60% | Super high output power |

According to the table above, it is known that by dynamically adjusting the percentages of the control signals GP1, GP2 and the image capturing signal STB in the image capturing frame period, the illumination brightness generated by the illumination device 201 may be dynamically adjusted, thereby effectively improving a working performance of the image sensing device.

Figure 3:
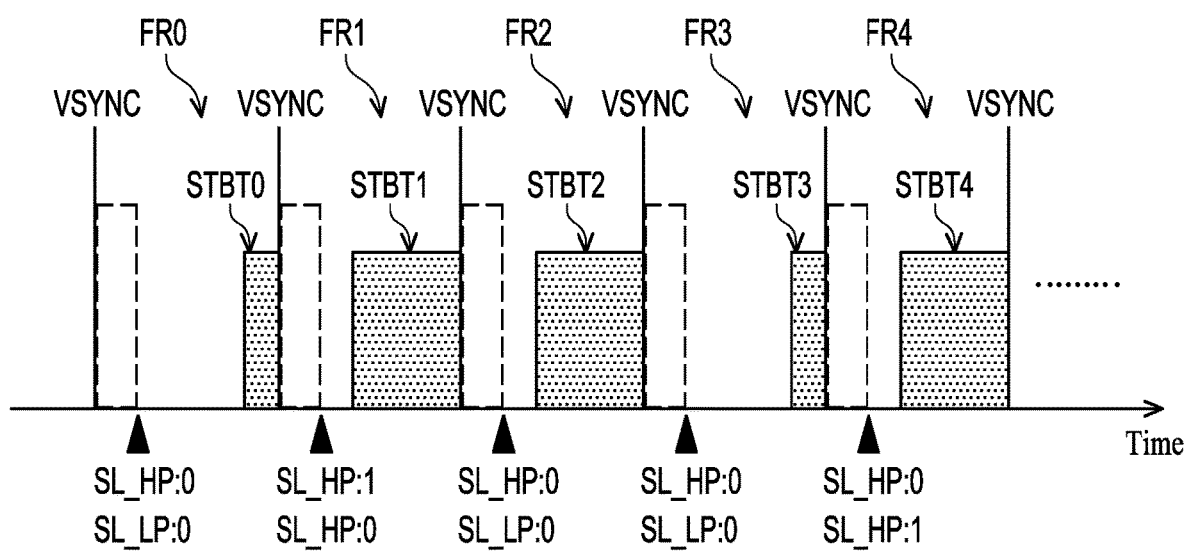
FIG. 3 is a schematic diagram of an operation of an image sensing device according to an embodiment of the invention.

Referring to FIG. 3 below, FIG. 3 is a schematic diagram of an operation of an image sensing device according to an embodiment of the invention. In FIG. 3, according to the vertical synchronization signal VSYNC, the operation of the image sensing device may be divided into multiple image capturing frame periods FR0-FR4. The control circuit may generate a control signal at a setting time point (for example, 500 microseconds) after the vertical synchronization signal VSYNC is enabled, and make the operation circuit to correspondingly generate the operation results SL_HP and SL_LP. In addition, in the embodiment, a time length during which the image capturing signal STB is enabled is configured into two modes, i.e., a first mode with a relatively short time length and a second mode with a relatively long time length.

In the embodiment, in the image capturing frame period FR0, a time length STBT0 during which the image capturing signal STB is enabled is the first mode, and the operation results SL_HP and SL_LP both have a logic value of 0, at this time, the illumination device does not emit light; in the image capturing frame period FR1, a time length STBT1 during which the image capturing signal STB is enabled is the second mode, and the operation results SL_HP and SL_LP respectively have logic values of 1 and 0, at this time, the illumination device provides the illumination brightness according to a high output power; in the image capturing frame period FR2, a time length STBT2 during which the image capturing signal STB is enabled is the second mode, and the operation results SL_HP and SL_LP both have logic values of 0, at this time, the illumination device does not emit light; in the image capture frame period FR3, a time length STBT3 during which the image capturing signal STB is enabled is the first mode, and the operation results SL_HP and SL_LP both have logic values of 0, at this time, the illumination device does not emit light; in the image capturing frame period FR4, a time length STBT4 during which the image capturing signal STB is enabled is the second mode, and the operation results SL_HP and SL_LP respectively have logic values of 0 and 1, at this time, the illumination device provides the illumination brightness according to the low output power.

It is easy to know from the above description that in the embodiment of the invention, the control device may adjust the control signal in real-time, and in collaboration with the setting mode of the time length during which the image capturing signal STB is enabled, the image sensing device may effectively adjust the illumination brightness provided by the illumination device to effectively improve working performance.

In summary, the control device of the illumination device of the invention may generate control signals to determine whether to activate the driving signal generators to generate the driving signals with different output powers, and drive the illumination device by providing the driving signal alone or providing the driving signals with different output powers, thereby effectively adjusting the illumination brightness of the illumination device.

What is claimed is:

1. A control device of an illumination device, adapted to an image sensing device, comprising:
   a control circuit generating a plurality of control signals;
   an operation circuit performing a logical operation, based on a percentage of an image capturing signal in an image capturing frame period, on the control signals to generate a plurality of operation results, wherein the image capturing frame period is defined by two adjacent vertical synchronization signals; and
   a plurality of driving signal generators respectively providing a plurality of driving signals to the illumination device according to the operation results, wherein the driving signals respectively have a plurality of different output powers.

2. The control device according to claim 1, wherein the control circuit provides the control signals to the operation circuit at a setting time point of each of the plurality of image capturing frame periods.

3. The control device according to claim 2, wherein the control circuit receives the vertical synchronization signal, and sets the image capturing frame periods according to the vertical synchronization signal.

4. The control device according to claim 1, wherein each of the driving signal generators respectively determines whether to provide the corresponding driving signal to the illumination device according to the operation results.

5. The control device according to claim 1, wherein an illumination brightness of the illumination device is proportional to a sum of the output powers of the received driving signals.

6. The control device according to claim 1, wherein the operation circuit comprises a plurality of logic gates, the logic gates respectively receive the control signals and commonly receive the image capturing signal, and the logic gates respectively generate the operation results.

7. The control device according to claim 6, wherein each of the logic gates is an AND gate.

8. An image sensing device, comprising:
a camera sensor providing an image capturing signal;
an illumination device comprising at least one illumination element; and
a control device, comprising:
a control circuit generating a plurality of control signals;
an operation circuit performing a logical operation, based on a percentage of an image capturing signal in an image capturing frame period, on the control signals to generate a plurality of operation results, wherein the image capturing frame period is defined by two adjacent vertical synchronization signals; and
a plurality of driving signal generators, respectively providing a plurality of driving signals to the illumination device according to the operation results, wherein the driving signals respectively have a plurality of different output powers.

9. The image sensing device according to claim 8, wherein the control circuit provides the control signals to the operation circuit at a setting time point of each of the plurality of image capturing frame periods.

10. The image sensing device according to claim 9, wherein the camera sensor further transmits the vertical synchronization signal to the control circuit, and the control circuit sets the image capturing frame periods according to the vertical synchronization signal.

11. The image sensing device according to claim 8, wherein each of the driving signal generators respectively determines whether to provide the corresponding driving signal to the illumination device according to the operation results.

12. The image sensing device according to claim 8, wherein an illumination brightness of the illumination device is proportional to a sum of the output powers of the received driving signals.

13. The image sensing device according to claim 8, wherein the camera sensor controls a lighting time length of the illumination device through the image capturing signal.

14. The image sensing device according to claim 8, wherein the camera sensor further performs a data transmission operation with the control device through a serial transmission interface.

\* \* \* \* \*